United States Patent
Hamilton, II et al.

(10) Patent No.: US 9,418,330 B2
(45) Date of Patent: Aug. 16, 2016

(54) SYSTEM AND METHOD FOR ENHANCING USER ACCESSIBILITY IN A VIRTUAL UNIVERSE

(75) Inventors: Rick A. Hamilton, II, Charlottesville, VA (US); Dimitri Kanevsky, Ossining, NY (US); Michael D. Kendzierski, New York, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1712 days.

(21) Appl. No.: 12/235,954

(22) Filed: Sep. 23, 2008

(65) Prior Publication Data

US 2010/0077305 A1    Mar. 25, 2010

(51) Int. Cl.
- G06F 3/048 (2013.01)
- G06G 7/48 (2006.01)
- G06N 3/00 (2006.01)
- G09B 21/00 (2006.01)

(52) U.S. Cl.
CPC .............. G06N 3/006 (2013.01); G09B 21/00 (2013.01)

(58) Field of Classification Search
USPC ............ 715/757, 865, 706; 455/466; 345/163
See application file for complete search history.

(56) References Cited

U.S. PATENT DOCUMENTS

| | | | |
|---|---|---|---|
| 5,806,017 A * | 9/1998 | Hancock | 701/209 |
| 6,084,556 A | 7/2000 | Zwern | |
| 6,161,126 A | 12/2000 | Wies et al. | |
| 6,396,509 B1 * | 5/2002 | Cheng | 715/706 |
| 7,010,581 B2 | 3/2006 | Brown et al. | |
| 7,253,803 B2 | 8/2007 | Schena et al. | |
| 8,595,631 B2 | 11/2013 | Cragun et al. | |
| 8,645,846 B2 | 2/2014 | Cragun et al. | |
| 2002/0097264 A1 * | 7/2002 | Dutta et al. | 345/745 |
| 2002/0138562 A1 | 9/2002 | Wies et al. | |
| 2002/0171647 A1 * | 11/2002 | Sterchi et al. | 345/473 |
| 2003/0069997 A1 | 4/2003 | Bravin et al. | |
| 2003/0207237 A1 | 11/2003 | Glezerman et al. | |
| 2005/0099291 A1 | 5/2005 | Landau | |
| 2006/0033716 A1 * | 2/2006 | Rosenberg et al. | 345/163 |
| 2006/0168107 A1 * | 7/2006 | Balan et al. | 709/218 |
| 2006/0181535 A1 * | 8/2006 | Watt | 345/473 |
| 2006/0189278 A1 | 8/2006 | Scott | |
| 2006/0206336 A1 | 9/2006 | Gurram et al. | |
| 2007/0130510 A1 | 6/2007 | Dharamshi et al. | |
| 2007/0174765 A1 | 7/2007 | Schleppenbach et al. | |
| 2008/0039124 A1 * | 2/2008 | Linder et al. | 455/466 |
| 2009/0259648 A1 * | 10/2009 | Bokor et al. | 707/5 |
| 2009/0309891 A1 * | 12/2009 | Karkanias et al. | 345/581 |

FOREIGN PATENT DOCUMENTS

WO   01/53928   7/2001

* cited by examiner

*Primary Examiner* — Matt Kim
*Assistant Examiner* — Tuan S Nguyen
(74) *Attorney, Agent, or Firm* — Lisa Ulrich; Andrew M. Calderon; Roberts Mlotkowski Safran & Cole, P.C.

(57) ABSTRACT

A system and method to enhance user accessibility in a virtual universe and, in particular, to enhance user accessibility by providing information and/or actions to users participating in the virtual universe. The system comprises an assignment engine configured to assign an accessibility unit to an item within a virtual universe and a detection engine configured to detect a triggering event, which triggers the accessibility unit. The system also comprises an accessibility action engine configured to provide at least one of information and an action to a user when the accessibility unit is triggered.

27 Claims, 4 Drawing Sheets

| AU Attribute | Attribute Data |
|---|---|
| Name | Person's apartment |
| UUID Association | a822bb2b-ff12-461d-b54d-dcd01a2de0c2 |
| Type | Text description of the apartment |
| Description | This AU will provide an audio description of the apartment |
| Event | 2 meter proximity to the front entrance |
| Attachment | An audio file that will be triggered by the AU. "/dev/VU/structures/person/apt.wav" |
| Log | log location |
| Rating | "Was this useful?" |

SYSTEM AND METHOD FOR ENHANCING USER ACCESSIBILITY IN A VIRTUAL UNIVERSE

FIELD OF THE INVENTION

The invention generally relates to a system and method for enhancing user accessibility in a virtual universe and, in particular, to enhancing user accessibility by providing information and/or actions to disabled users participating in the virtual universe.

BACKGROUND OF THE INVENTION

More than 500 million people in the world have some form of disability, ranging across varying forms of mental, physical, and sensory disabilities. Society has implemented a number of real world methods to provide better access for people of varying disabilities. For example, handicapped parking spaces have been created to allow disabled persons to park closer to commercial businesses. Society has also implemented audible noises from sign-posts to alert the visually impaired that it is safe to cross the street. Moreover, low-gradient ramps have been created to make entering a multilevel building easier for persons confined to wheelchairs or whom have difficulties with stairs.

A virtual universe (VU) is an interactive simulated environment accessed by multiple users through an online interface. Users inhabit and interact in the VU via avatars, which are a user's representation of himself or herself. These representations can be in the form of a three-dimensional model, a two-dimensional icon, a text construct, a user screen name, etc. Although there are many different types of VUs, there are several features many VUs generally have in common. These features include, for example,

- Shared Space: the VU allows many users to participate at once;
- Graphical User Interface: the VU depicts space visually, ranging in style from 2D "cartoon" imagery to more immersive 3D environments;
- Immediacy: interaction takes place in real time;
- Interactivity: the VU allows users to alter, develop, build, or submit customized content;
- Persistence: the VU's existence continues regardless of whether individual users are logged in; and
- Socialization/Community: the VU allows and encourages the formation of social groups such as teams, guilds, clubs, cliques, housemates, neighborhoods, etc.

Disabled users participating in VUs are at a disadvantage due to their disabilities, which can limit their ability to fully experience and interact within a VU. For example, users who have visual or auditory disabilities may be unable to interact with objects, structures, or avatars in a VU, which are largely based on sight and sound. Thus, a user with poor eyesight may be unable to navigate steps or open doors in a VU, which limits the extent to which the user can participate in the VU.

SUMMARY OF THE INVENTION

In a first aspect of the invention, a system comprises an assignment engine configured to assign an accessibility unit to an item within a virtual universe and a detection engine configured to detect a triggering event, which triggers the accessibility unit. The system also comprises an accessibility action engine configured to provide at least one of information and an action to a user when the accessibility unit is triggered.

In another aspect of the invention, a computer implemented method for enhancing accessibility in a virtual universe comprises adding an accessibility tag to a user's avatar and assigning an accessibility unit to an item. The computer implemented method also comprises determining whether the accessibility unit is triggered and providing one or more of an action and information if the accessibility unit is triggered.

In another aspect of the invention, a computer program product comprising a computer usable medium having readable program code embodied in the medium is provided. The computer program product includes at least one component operable to: associate an accessibility tag with a disabled user's avatar; assign an accessibility unit to an item in a virtual universe; determine whether the accessibility unit is triggered; and provide an action or information to the disabled user if the accessibility unit is triggered.

In yet another aspect of the invention, a method for enhancing accessibility in a virtual universe, comprises providing a computer infrastructure being operable to: assign an accessibility tag to an avatar profile; assign one or more accessibility units to an item; ascertain whether at least one of the one or more accessibility units is triggered; and provide an action or information if the accessibility unit is triggered.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The invention is directed to a system and method for enhancing user accessibility in a VU and, in particular, to enhancing user accessibility by providing information and/or actions to disabled users participating in the VU. More specifically, the invention allows a user to add an accessibility tag to an avatar's profile, which indicates a disability of the user. Exemplary disabilities may include, but are not limited to, hearing and/or visual impairments.

The invention also allows one or more accessibility units (AUs) to be added to an item, structure, and/or avatar, etc. An item may include any virtual unit or object. An AU may include, e.g., information about an item, structure, and/or avatar, etc., which may be presented to an avatar having an accessibility tag. This information may be presented when a triggering event occurs. A triggering event may include, e.g., the AU sensing that an avatar with an accessibility tag is within a certain proximity of the AU. A triggering event may also include, e.g., a user moving a mouse over an item and/or an avatar that has an AU.

Once the AU is triggered, the AU can send a signal to an accessibility action engine, which may present the user with audio information and/or textual information about the item and/or avatar with the AU. The accessibility action engine may also enlarge existing text, provide additional and/or alternative text, provide force feedback and/or beeps, etc., to help disabled users better navigate the VU.

In addition to providing disabled users with audio and/or textual information, embodiments of the invention also allow the VU to take one or more actions to make an item, structure, etc., more accessible. For example, embodiments may widen a doorway to help users with poor motor functions and/or visual impairments to better navigate through the doorway.

By providing disabled users with information about one or more VU items, landscapes, structures, avatars, etc., the invention allows disabled users to have a more enriching experience while participating in the VU. Moreover, the invention allows disabled users to share a similar experience as other users while exploring a VU, which, in turn, is likely to attract more users to VUs, thereby increasing the number of potential consumers that can purchase and/or sell goods and services within the VU. Thus, the invention provides disabled persons with the ability to better access and participate in VUs and allows virtual service providers to grow their user base, strengthen their brands, and provide access to all who seek it.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM),
an optical storage device, and/or The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 1:
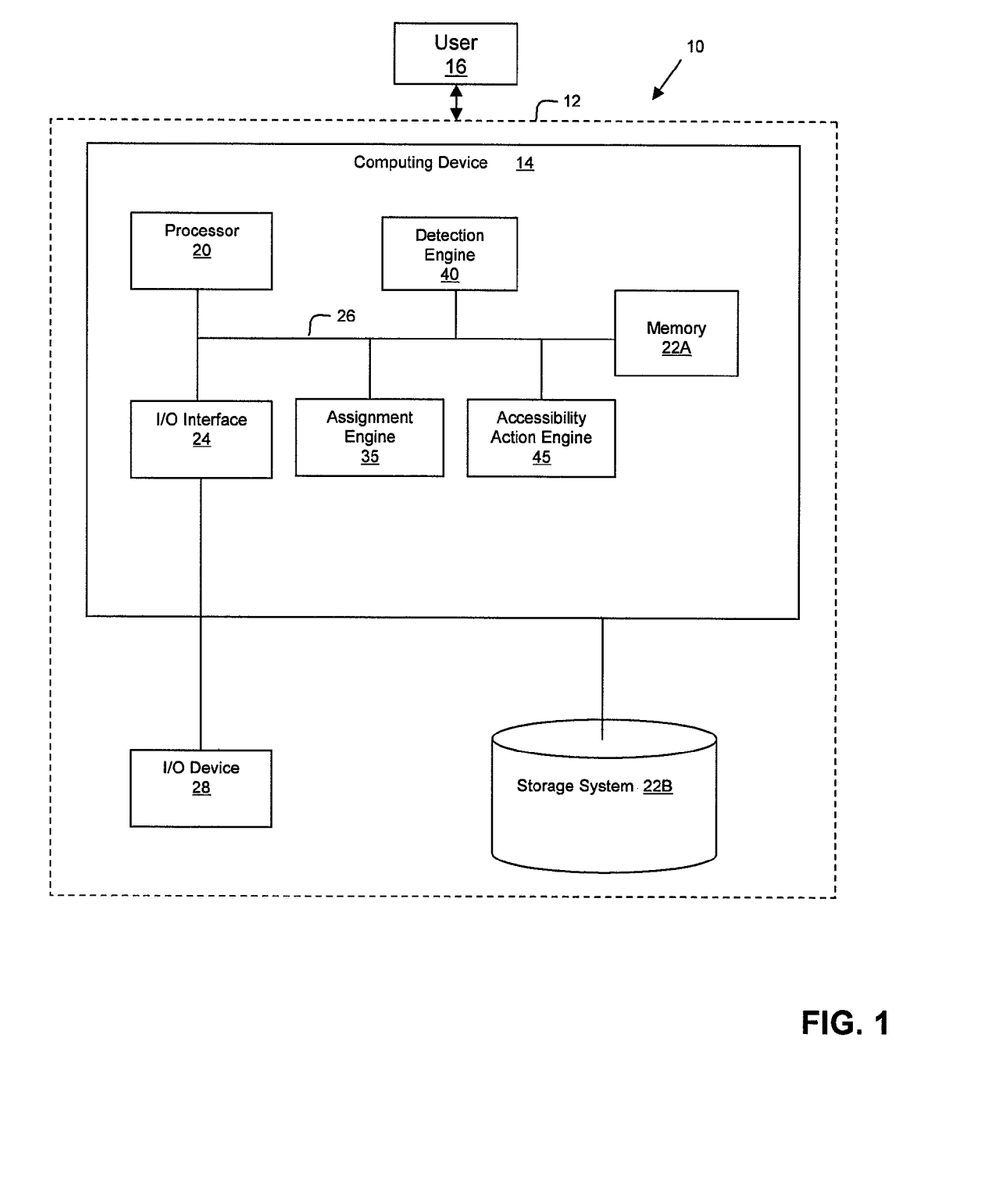
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises an Assignment Engine 35, which makes computing device 14 operable to assign a accessibility tag to an avatar and/or assign an AU to an item, structure, and/or an avatar, etc. The computing device 14 also comprises a Detection Engine 40, which makes computing device 14 operable to detect when a triggering event occurs, such as when a user 16 who has an accessibility tag is proximate to an item or an avatar having an AU. The computing device 14 further comprises an Accessibility Action Engine 45, which makes computing device 14 operable to provide information and/or an action to the user 16 when the triggering event occurs. By utilizing the Assignment Engine 35, Detection Engine 40, and the Accessibility Action Engine 45, disabled users can better access and participate in VUs in accordance with the invention, e.g., process described herein.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution.

The computing device 14 is in further communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, microphones, headsets, etc. The storage system 22B can include an "inventory" of sounds, modifications, etc., which may be selected by the user's avatar.

In general, the processor 20 executes computer program code, which is stored in the memory 22A and/or storage system 22B. The computer code may be representative of the functionality of the Assignment Engine 35, the Detection Engine 40, and the Accessibility Action Engine 45. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the processes described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Exemplary Implementation of the System

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
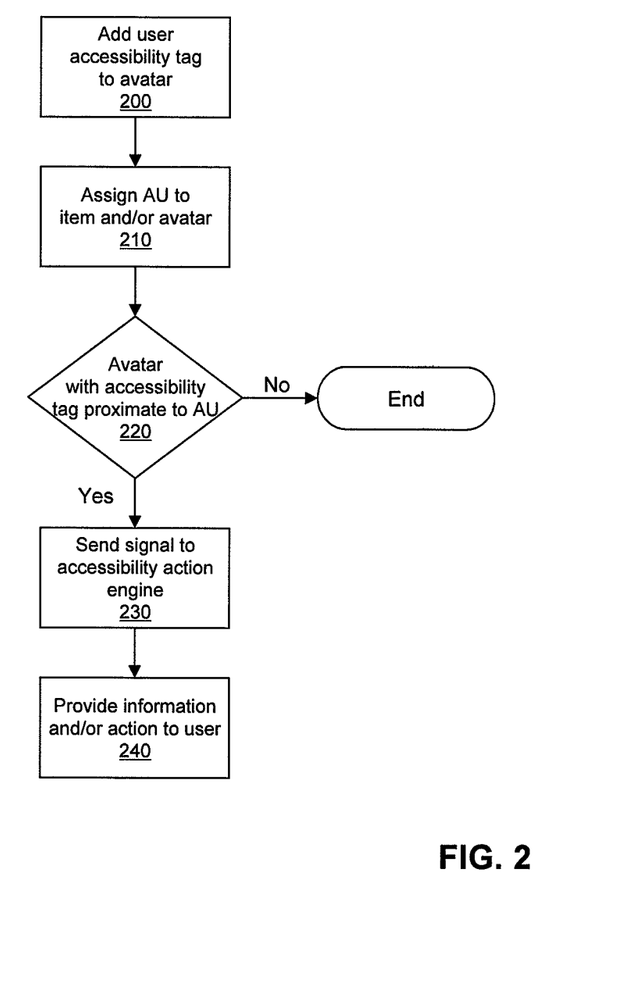
FIG. 2 shows a flow chart of an exemplary process in accordance with aspects of the invention.

Referring to FIG. 2, an accessibility tag may be assigned to a user's avatar, at step 200. The assignment may be performed by the Assignment Engine, which is configured to add one or more accessibility tags to, e.g., an avatar's profile. An accessibility tag may be used to indicate what type of disability the user has and/or include one or more user preferences relating to the user's disability. For example, a user with a visual impairment may add preferences relating to how large of font the user can read, what colors of font the user can read, whether audio messages are preferred over textual messages, how easy or difficult it is for the user to navigate through one or more obstacles in the VU, etc. Users with hearing impairments may add preferences relating to, e.g., how frequently textual messages should be presented to the user, whether the user would like to receive forced feedback, etc. In embodiments, details relating to a user's disability are stored securely to prevent unauthorized access to the user's information.

One or more AUs may be assigned to an item and/or an avatar within the VU via the Assignment Engine, at step 210. More specifically, one or more AUs may be created and/or made available by a user, a VU administrator, a service provider, etc. These AUs are configured to provide disabled users with information about virtual items, structures, and/or avatars in the VU so that disabled users may enjoy the same virtual experiences as non-disabled users.

AUs may include a number of attributes relating to an item's and/or an avatar's audio, text, and/or touch capabilities. Exemplary attributes may include: an AU name; a universally unique identifier (UUID); a description of the AU; an AU type; an attachment; a triggering event; a log; and/or a rating; etc.

In particular, an AU name may be used to identify one or more AUs. The AU may be associated or linked to an item and/or an avatar via a UUID. A UUID is an identifier standard, which enables each item, avatar, etc., to be uniquely identified. This standard also ensures that the same UUID will not be unintentionally used by to describe another item, avatar, etc.

A description attribute may be used to describe the AU. For example, a description attribute may describe the AU as providing an audio or textual description of a house and all entrances to the house. In embodiments, an AU type attribute may be used to describe the type of AU being associated with the item and/or avatar. Exemplary AU types may include, e.g., audio, textual, force feedback, beeps, etc.

Embodiments may include an attachment attribute, which is a textual format providing a description of a the AU, audio file, sound file, etc. For example, an attachment attribute may include a path to where an audio file is stored. In embodiments, the attachment attribute may be employed when the AU is triggered.

An event attribute may describe one or more types of events that are configured to trigger the AU. Exemplary event triggers may include the proximity of the user to an AU, a sensor to sense disabled users, and/or a user identifying or pointing to the AU via an input/output device. In embodiments, the AU may be triggered each time an event occurs. However, embodiments may provide optional settings so that once the AU is triggered, it cannot be triggered again by the same avatar.

A log attribute may be included to track one or more AU events and/or how often the AU was triggered. Additionally, in embodiments, a user may be asked to rate the usefulness of the AU. This may include, e.g., providing suggestions on how to improve the AU and ratings as to the location of the AU. This may also include feedback on the type and quality of the information and/or actions as well as how useful the AU was in providing accessibility to the disabled user.

A determination can be made as to whether an AU has been triggered, at step 220. The AU can be triggered when an event attribute is detected as being satisfied. This detection can be performed by the Detection Engine. For example, the Detection Engine can detect if an avatar with an accessibility tag is within a certain proximity of an item or an avatar having an AU. The degree of proximity may be predefined and vary between embodiments based on the item with the AU, the avatar with the AU, and/or the avatar with the accessibility tag, etc. If an avatar with an accessibility tag is detected, the AU may be triggered. If an avatar with an accessibility tag is not detected, the Detection Engine may continue until a detection is made or, optionally, terminate.

If the AU is triggered, the Detection Engine can send a signal to an Accessibility Action Engine, at step 230. The Accessibility Action Engine may receive the signal from the Detection Engine and provide information and/or an action to the user, at step 240. The type of information and/or action provided to the user may vary depending on the information associated with the AU and the user's preferences, as defined in the avatar's accessibility tag. For example, certain information may be provided via the AU, such as alternative text, enlarged text, an audio file or recording, forced feedback, and/or beeps, etc.

Alternative text may be provided to a disabled user to supply the user with information about an item, structure, and/or avatar, etc. Alternative text may include one or more additions and/or modifications to an existing text and/or new text. In embodiments, alternative text may be presented in any number of languages, based upon the content and metadata within the avatar's accessibility tag. Exemplary alternative text may include instructions, guidance, explanations, etc., to help the disabled user interact within the VU. For example, if an accessibility tag is near a set of steep stairs that an avatar may have trouble ascending, the AU may trigger the production of information to provide guidance, alternatives, and so forth, to the user. In embodiments, the text may be triggered automatically by the proximity of the accessibility tag to an AU or affirmatively by a user triggering the alternative text by selecting the item, pointing to the item, and/or otherwise identifying the item.

The AU may provide a number of additional visual features. For example, the AU may include enlarged text for users having visual disabilities. Additionally, the AU may alter text fonts, text colors, text backgrounds, contrast between text, etc., so the text can be more easily readable by the user. Optionally, the text may even be presented to users as part of the VU or in a separate window, such as a pop-up window.

The AU may provide a number of audio features. For example, the AU may provide audio files or recordings for users with visual disabilities in order to provide the user with a description and/or a warning of a proximate item, structure, space, and/or avatar, etc. In embodiments, audio files and/or recordings may also be used to make text in the VU audible to persons having dyslexia or other reading disabilities.

The AU may provide force feedback and/or beeps to disabled users. For example, force feedback may be provided to help a visually disabled user better navigate a VU by providing feedback, such as a vibration, to the user via an input/output device when the user is close to an item or structure. In embodiments, beeps may also be used to inform the disabled user that he/she is close to a structure.

The AU is further configured to cause an action to occur within a VU by running one or more scripts. For example, if a user has difficulty seeing and/or navigating through doors in a VU, a script may be run to widen one or more VU doors to allow the user to better function in the VU. Similarly, an action may be taken to transform high, clunky steps into low steps or a ramp to enable avatars with poor coordination to more easily ascend. Likewise, an action may be taken to alter existing signs to make them more readable. Embodiments may also allow information that is normally presented in audio form, such as instructions, welcomes, ambient sounds, etc., to be conveyed through text for users with a hearing disability.

In embodiments, some or all of steps 200, 210, 220, 230, and 240 may be iterated to continuously provide a user with information and/or actions to enable the user to better interact in the VU. Moreover, to facilitate the iterative nature of the invention, embodiments may modify one or more AUs so that the AU is not triggered multiple times by the same user as the user navigates throughout a structure within the VU, comes into the same item or avatar in the VU, etc. This may be an optional setting so that once the AU is activated, the AU does not need to continually repeat information and/or actions multiple times.

Accessibility Units

AUs may be provided by an entity and/or a VU. In embodiments, AUs may be implemented in a standard interface and format so that the AUs may be used throughout the VU. Moreover, in embodiments, the AU may be stored in an inventory as part of the VU, which provides flexibility between the VU and the entity creating the AU.

AUs may be reused throughout one or more VUs such that multiple items in a VU can have identical AUs. For example, a door to a house may have the same AU as a door to a hospital. Likewise, an AU that turns a set of stairs into a ramp may be applied to a rugged country side to make it more easily navigable. In embodiments, these AUs may exchange information according to a standard interface and format.

In embodiments, a number of methods may be used to reduce and/or eliminate the overuse of AU tagging and AU events, e.g., for users who are not handicapped. For example, disabled users may need to be within a predefined proximity of an AU before information is presented to the user. This prevents the AU from being triggered by users that are merely passing through a region and/or are too far away from the AU to benefit from the information provided by the AU.

Embodiments may also reduce and/or eliminate the overuse of AU tagging and AU elements by using the AU to identify whether the user has an accessibility tag and/or the form of the user's disability. Once identified, appropriate audio, visual, and/or touch information, which is associated with the AU, may be provided to the user based on the user's identified disabilities. If no disabilities are identified, or the AU does not include information for an identified disability, the information need not be presented to the user.

Exemplary Embodiment

Figure 3:
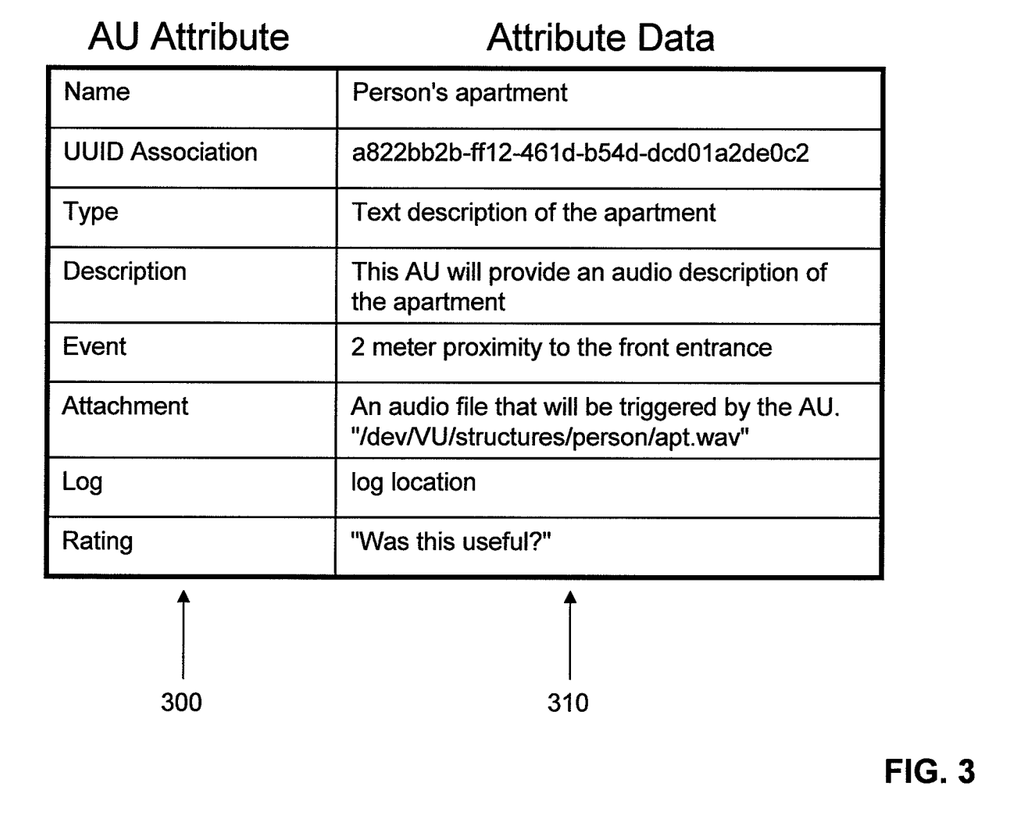
FIG. 3 shows an exemplary accessibility unit in accordance with aspects of the invention.

FIG. 3 illustrates exemplary AU attributes in accordance with embodiments of the invention. The exemplary AU attributes may include: an AU name; a UUID; a description of the AU; an AU type; an attachment; a triggering event; a log; and/or a rating; etc. These AU attributes may be represented in column 300. Data about one or more of the AU attributes may be included in column 310.

More specifically, FIG. 3 includes a name attribute, such as "Person's Apartment", which may be used to identify the AU. The AU may also be associated with a UUID for the item the AU is servicing, such as "a822bb2b-ff12-461d-b54d-dcd01a2de0c2", which uniquely identifies the item.

A type attribute may be included, which indicates that the type of AU being associated with apartment is textual. A description attribute may also be included to describe the AU such as, e.g., to provide an audio description of the apartment.

An event attribute may be used to indicate how the AU may be triggered. For example, an event may be triggered when the AU detects a disabled user within two virtual meters of the front entrance of the person's apartment. The happening of this event may trigger an audio file, such as "/dev/VU/structures/person/apt.wav", which may be provided in an attachment attribute. This audio file may be played for the disabled user and describe the structure and size of the apartment as well as how to enter the apartment. This makes the disabled user aware of the apartment in front of him/her and provides background information on the structure, which helps the user navigate the person's apartment.

A log attribute may be included to log the location of the AU in the VU. Additionally, a rating attribute may be included to ask the user if the AU was useful. In embodiments, the ratings may be stored in a storage unit, such as 22B, and used to increase the usefulness of the AU in the VU.

Figure 4:
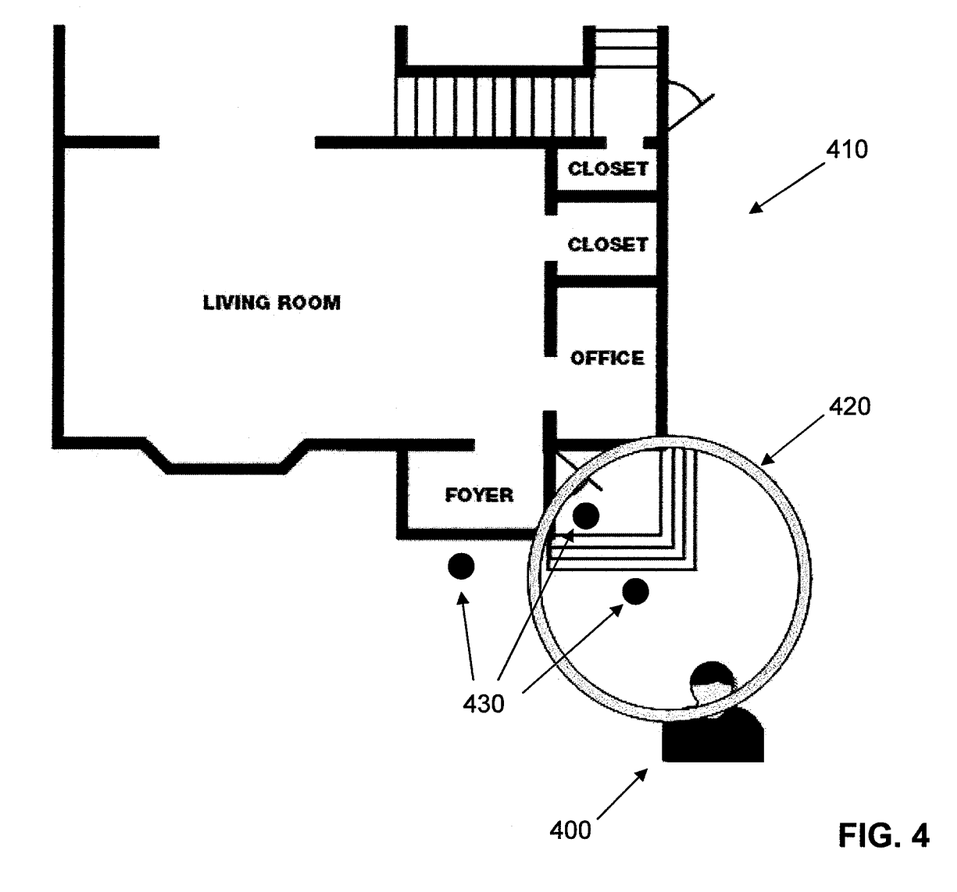
FIG. 4 shows an exemplary embodiment in accordance with aspects of the invention.

FIG. 4 illustrates an embodiment utilizing the AU described in FIG. 3. More specifically, FIG. 4 includes a disabled user 400 who is within a certain proximity 420 of the person's apartment 410. The person's apartment 410 may include one or more AUs 430, which may be placed near doorways, steps, walls, etc. One or more of the AUs 430 may be triggered when the user 400, having an accessibility tag comes within a certain proximity 420 of an AU 430. This proximity may be defined by the AU 430 and include specific and/or general ranges that the user 400 should be within before the AU 430 can sense the user 400 and the AU 430 can be triggered. Once the AU is triggered, the user 400 may be presented, e.g., with an audio message describing the structure and size of the apartment 410 as well as how to enter the apartment 410. This makes the user 400 aware of how to access the apartment 410 and provides the user 400 with information on how to navigate the apartment 410.

In embodiments, multiple AUs 430 may be located throughout the person's apartment 410 and be used to help a disabled user 400 navigate through the apartment 410. For example, an AU 430 may describe how to enter the apartment 410 and another AU 430 may provide the disabled user 410 with additional information in audio or text format regarding the characteristics of the entrance, such as the size of a door and/or how to navigate through the entrance.

Additional Embodiments

While the invention has been described in terms of embodiments, those skilled in the art will recognize that the invention can be practiced with modifications and in the spirit and scope of the appended claims. Additionally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A system implemented in hardware, comprising:
a computer infrastructure comprising:
an assignment engine configured to:
assign an accessibility unit to an item within a virtual universe; and
assign an accessibility tag to an avatar of the user, the accessibility tag being indicative of a disability of the user;
a detection engine configured to detect a triggering event, which triggers the accessibility unit; and
an accessibility action engine configured to provide at least one of information and an action to a user when the accessibility unit is triggered,
wherein the information and the action provided to the user is dependent upon the disability of the user that is indicated by the accessibility tag assigned to the user; and
the information is about the item and includes forced feedback, beeps, and one or more of alternative text, enlarged text, and an audio file or recording based on the disability of the user.

2. The system of claim 1, wherein the triggering event is the accessibility unit sensing that the accessibility tag is within a predefined proximity of the accessibility unit.

3. The system of claim 1, wherein the accessibility unit comprises a plurality of attributes configured to help the user navigate the virtual universe.

4. The system of claim 3, wherein the plurality of attributes include an accessibility unit name; a universally unique identifier; a description of the accessibility unit; an accessibility unit type; an attachment; the triggering event; a log; and a rating.

5. The system of claim 1, wherein the action modifies the item in the virtual universe such that the item is more accessible to the user based on the disability of the user.

6. The system of claim 5, wherein:
the information includes the alternative text when the user has at least one of a motor disability and a hearing disability;
the information includes one or more of the enlarged text, the audio file or recording, the forced feedback, and the beeps when the user has at least one a visual disability and a reading disability;
the action modifies the item in the virtual universe to help the user with at least one of the motor disability and the visual disability to navigate through or around the item; and
at least one of the motor disability, the hearing disability, the visual disability, and the reading disability are associated with the accessibility tag assigned to the user such that the information and the action provided to the user is dependent upon the disability of the user.

7. The system of claim 1, wherein the item is a virtual unit or object.

8. A computer implemented method for enhancing accessibility in a virtual universe, comprising:
adding, by a processor, an accessibility tag to a user's avatar, the accessibility tag being indicative of a disability of the user;
assigning, by the processor, an accessibility unit to an item;
determining, by the processor, whether the accessibility unit is triggered; and
providing, by the processor, one or more of an action and information if the accessibility unit is triggered,
wherein the action and the information provided is dependent upon the disability of the user that is indicated by the accessibility tag added to the user's avatar; and
the information is about the item and includes forced feedback, beeps, and one or more of alternative text, enlarged text, an audio file or recording based on the user's disability.

9. The method of claim 8, wherein the accessibility unit is reusable throughout one or more virtual universes.

10. The method of claim 8, wherein the accessibility unit is configured to be triggered only once per user.

11. The method of claim 8, wherein the accessibility unit comprises a plurality of attributes configured to help disabled users interact in the virtual universe, the plurality of attributes including an accessibility unit name; a universally unique identifier; a description of the accessibility unit; an accessibility unit type; an attachment; a triggering event; a log; and a rating.

12. The method of claim 8, wherein the steps of claim 9 are implemented on a combination of software, hardware, or software and hardware.

13. The method of claim 8, wherein the steps of claim 9 are offered by a service provider based on one of a fee and subscription basis.

14. The method of claim 8, comprising:
adding the accessibility tag to an avatar profile;
assigning the accessibility unit to the item, the accessibility unit having a plurality of attributes including an accessibility unit name; a universally unique identifier; a description of the accessibility unit; an accessibility unit type; an attachment; a triggering event; a log; and a rating;
determining whether the accessibility unit is triggered by the accessibility tag being within a predefined proximity of the accessibility unit; and
modifying the item or presenting a user with the information when the accessibility unit is triggered.

15. The method of claim 8, wherein:
the information includes the alternative text when a user has at least one of a motor disability and a hearing disability;
the information includes one or more of the enlarged text, the audio file or recording, the forced feedback, and the beeps when the user has at least one a visual disability and a reading disability;
the action modifies the item to be more accessible to the user based on the user's disability
the action modifies the item to help the user with at least one of the motor disability and the visual disability to navigate through or around the item; and
at least one of the motor disability, the hearing disability, the visual disability, and the reading disability are associated with the accessibility tag added to the user's avatar such that the information and the action provided to the user is dependent upon the disability of the user.

16. A computer program product comprising a computer usable hardware storage memory having readable program code embodied in the computer usable storage memory, the computer program product includes at least one component operable to:
associate an accessibility tag with a disabled user's avatar, the accessibility tag being indicative of a disability of the user;
assign an accessibility unit to an item in a virtual universe;
determine whether the accessibility unit is triggered; and
provide an action or information to a disabled user if the accessibility unit is triggered,
wherein the action and the information provided to the disabled user is dependent upon the disability of the user that is indicated by the accessibility tag associated with the disabled user's avatar; and
the information is about the item and includes forced feedback, beeps, and one or more of alternative text, enlarged text, an audio file or recording based on the disabled user's disability.

17. The computer program product of claim 16, wherein the accessibility unit is configured to be reusable throughout one or more virtual universes.

18. The computer program product of claim 16, wherein the action is configured to modify the item to be more accessible to the disabled user based on the disabled user's disability.

19. The computer program product of claim 18, wherein:
the information includes the alternative text when the disabled user has at least one of a motor disability and a hearing disability;
the information includes one or more of the enlarged text, the audio file or recording, the forced feedback, and the beeps when the disabled user has at least one a visual disability and a reading disability;

the action is configured to modify the item to help the disabled user with at least one of the motor disability and the visual disability to navigate through or around the item; and at least one of the motor disability, the hearing disability, the visual disability, and the reading disability are associated with the accessibility tag associated with the disabled user's avatar such that the information and the action provided to the user is dependent upon the disability of the user.

20. The computer program product of claim 16, wherein the computer program product is at least one of supported, deployed, maintained, and created by a service provider.

21. The computer program product of claim 16, wherein the computer program product is offered by a service provider based on one of a fee and subscription basis.

22. The computer program product of claim 16, comprising at least one component operable to:
  add the accessibility tag to an avatar profile;
  assign the accessibility unit to the item within the virtual universe, the accessibility unit having a plurality of attributes including an accessibility unit name; a universally unique identifier; a description of the accessibility unit; an accessibility unit type; an attachment; a triggering event; a log; and a rating;
  determine whether the accessibility unit is triggered by the accessibility tag being within a predefined proximity of the accessibility unit; and
  modify the item or present the disabled user with the information when the accessibility unit is triggered.

23. A method for deploying an application for enhancing accessibility in a virtual universe, comprising:
  providing a computer infrastructure being operable to:
    assign an accessibility tag to an avatar profile, the accessibility tag being indicative of a disability of a disabled user associated with the avatar profile;
    assign one or more accessibility units to an item;
    ascertain whether at least one of the one or more accessibility units is triggered; and
    provide an action or information if the accessibility unit is triggered,
  wherein the action and the information provided is dependent upon the disability of the user that is indicated by the accessibility tag assigned to the avatar profile; and
  the information is about the item and includes forced feedback, beeps, and one or more of alternative text, enlarged text, an audio file or recording based on the disability of the disabled user.

24. The method of claim 23, wherein the action and the information are configured to help the disabled user participate in the virtual universe.

25. The method of claim 23, wherein the one or more accessibility units comprise a plurality of attributes including an accessibility unit name; a universally unique identifier; a description of the accessibility unit; an accessibility unit type; an attachment; a triggering event; a log; and a rating.

26. The method of claim 23, wherein the computer infrastructure is at least one of supported, deployed, maintained, and created by a service provider.

27. The method of claim 23, wherein:
  the information includes the alternative text when the disabled user has at least one of a motor disability and a hearing disability;
  the information includes one or more of the enlarged text, the audio file or recording, the forced feedback, and the beeps when the disabled user has at least one a visual disability and a reading disability;
  the action modifies the item to be more accessible to the disabled user based on the disability of the disabled user; and
  the action modifies the item to help the disabled user with at least one of the motor disability and the visual disability to navigate through or around the item; and
  at least one of the motor disability, the hearing disability, the visual disability, and the reading disability are associated with the accessibility tag assigned to the avatar profile such that the information and the action provided to the user is dependent upon the disability of the user.

* * * * *